United States Patent
Achtermann et al.

(10) Patent No.: US 8,812,297 B2
(45) Date of Patent: Aug. 19, 2014

(54) METHOD AND SYSTEM FOR INTERACTIVELY FINDING SYNONYMS USING POSITIVE AND NEGATIVE FEEDBACK

(75) Inventors: Jeffrey M. Achtermann, Austin, TX (US); Indrajit Bhattacharya, New Delhi (IN); Kevin W. English, Fairfield, CT (US); Shantanu R. Godbole, New Delhi (IN); Ajay K. Gupta, New Delhi (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 12/757,580

(22) Filed: Apr. 9, 2010

(65) Prior Publication Data

US 2011/0251839 A1  Oct. 13, 2011

(51) Int. Cl.
*G06F 17/27* (2006.01)
*G06F 17/28* (2006.01)

(52) U.S. Cl.
CPC ............ *G06F 17/27* (2013.01); *G06F 17/2705* (2013.01); *G06F 17/271* (2013.01); *G06F 17/277* (2013.01); *G06F 17/278* (2013.01); *G06F 17/2735* (2013.01); *G06F 17/2785* (2013.01); *G06F 17/28* (2013.01); *G06F 17/2818* (2013.01)
USPC ........................ 704/9; 704/7; 704/8; 704/257

(58) Field of Classification Search
CPC ... G06F 17/27; G06F 17/2705; G06F 17/271; G06F 17/277; G06F 17/2785; G06F 17/2735; G06F 17/28; G06F 17/2818
See application file for complete search history.

(56) References Cited

U.S. PATENT DOCUMENTS

| | | |
|---|---|---|
| 4,384,329 A | 5/1983 | Rosenbaum et al. |
| 6,411,932 B1 | 6/2002 | Molnar et al. |
| 6,513,033 B1 | 1/2003 | Trauring |
| 6,523,001 B1 | 2/2003 | Chase |
| 7,483,829 B2 | 1/2009 | Murakami |
| 7,860,706 B2 | 12/2010 | Abir |
| 8,171,403 B2 | 5/2012 | Flint et al. |
| 2002/0040359 A1 | 4/2002 | Green et al. |
| 2002/0107851 A1 | 8/2002 | Beauchamp |
| 2002/0156774 A1 | 10/2002 | Beauregard et al. |
| 2004/0133418 A1 | 7/2004 | Turcato et al. |

(Continued)

FOREIGN PATENT DOCUMENTS

JP  06266769  9/1994

OTHER PUBLICATIONS

Zhang, Chen; Chai, Joyce Y.; and Jin, Rong, "User Term Feedback in Interactive Text-based Image Retrieval", 2005. SIGIR'05, Aug. 15-19, 2005, Salvador, Brazil.

(Continued)

*Primary Examiner* — Leonard Saint Cyr
(74) *Attorney, Agent, or Firm* — Ference & Associates LLC

(57) ABSTRACT

Determining synonyms of words in a set of documents. Particularly, when provided with a word or phrase as input, in exemplary embodiments there is afforded the return of a predetermined number of "top" synonym words (or phrases) for an input word (or phrase) in a specific collection of text documents. Further, a user is able to provide ongoing and iterative positive or negative feedback on the returned synonym words, by manually accepting or rejecting such words as the process is underway.

19 Claims, 5 Drawing Sheets

(56) References Cited

U.S. PATENT DOCUMENTS

| | | | |
|---|---|---|---|
| 2004/0186828 A1* | 9/2004 | Yadav et al. ................ 707/3 |
| 2005/0033568 A1 | 2/2005 | Yu et al. |
| 2005/0114130 A1 | 5/2005 | Java et al. |
| 2005/0160065 A1 | 7/2005 | Seeman |
| 2005/0210042 A1* | 9/2005 | Goedken ................ 707/100 |
| 2007/0011154 A1* | 1/2007 | Musgrove et al. ................ 707/5 |
| 2007/0067280 A1 | 3/2007 | Zhou et al. |
| 2007/0208734 A1 | 9/2007 | Koide et al. |
| 2007/0208755 A1 | 9/2007 | Bhatkar et al. |
| 2007/0250486 A1 | 10/2007 | Liao et al. |
| 2007/0282811 A1* | 12/2007 | Musgrove ................ 707/3 |
| 2008/0091670 A1* | 4/2008 | Ismalon ................ 707/5 |
| 2008/0140643 A1* | 6/2008 | Ismalon ................ 707/5 |
| 2008/0243486 A1 | 10/2008 | Summitt |
| 2010/0030715 A1 | 2/2010 | Eustice et al. |
| 2010/0198802 A1* | 8/2010 | Kraftsow et al. ................ 707/706 |
| 2010/0332503 A1* | 12/2010 | Buckley et al. ................ 707/759 |

OTHER PUBLICATIONS

Nagata, Noriko, "The Effectiveness Computer-Assisted interactive Glosses", Foreign Language Annals, 32 (4), 469-479, 1999.

Jain, Alpa et al., "Acronym-Expansion Recognition and Ranking on the Web," Information Reuse and Integration, 2007, IRI 2007, ISBN: 1-4244-1500-4, Sep. 4, 2007, pp. 209-214, IEEE Digital Library. Copy can be found at www.cs.columbia.edu/~alpa/Papers/ieee-iri07.pdf. Accessed Mar. 25, 2014.

Lee, Chun-Jen et al., Alignment of Bilingual Named Entities in Parallel Corpora Using Statistical Models and Multiple Knowledge Sources, ACM Transactions on Asian Language Information Processing, pp. 121-145, vol. 5, No. 2, ACM Digital Library, Jun. 2006.

* cited by examiner

FIG. 3 next word: noise
parsed yes words: [noise]
parsed no words: [ ]
* noise 1.0
* vibration 0.836
* sound 0.697
* still 0.602
* brakes 0.596
* problem 0.567
* rattling 0.555
* rattle 0.542
* issue 0.536
* worse 0.528
* making 0.525
* issues 0.525
* front 0.519
* problems 0.512
* fixed 0.511
next word:

US 8,812,297 B2

METHOD AND SYSTEM FOR INTERACTIVELY FINDING SYNONYMS USING POSITIVE AND NEGATIVE FEEDBACK

BACKGROUND

Data exploration or mining has become an important activity in automatically reviewing large collections of text documents, for a wide variety of business, academic or other purposes. In that context, it is often important to identify the different ways in which a particular object, concept or issue is mentioned in such a collection of documents.

By way of an illustrative example, a data exploration or mining arrangement can review customer surveys relating to automobiles. If there is an interest in finding all customer surveys that mention dealers, it may not be sufficient merely to search using just the words "dealer" and "dealership". This could well overlook a large number of surveys that include common or peculiar abbreviations such as "dlr", "dlrship" or "dlshp", along with common misspellings such as "daeler".

BRIEF SUMMARY

In accordance with preferred embodiments of the present invention, data exploration problems as mentioned previously are obviated. Particularly, when provided with a word or phrase as input, in exemplary embodiments there is afforded the return of a predetermined number of "top" synonym words (or phrases) for an input word (or phrase) in a specific collection of text documents.

In summary, one aspect of the invention provides a method comprising: inputting a key word; presenting a list of possible synonyms of the key word; soliciting feedback on whether a possible synonym is a synonym candidate for the key word or not a synonym candidate for the key word; repeating said soliciting of feedback until a defined endpoint is reached; determining a match score of each of the possible synonyms; retaining a number of the possible synonyms up to and including a target number and discarding a number of the possible synonyms in excess of the target number, the discarded synonyms generally having lower match scores than the retained synonyms.

Another aspect of the invention provides an apparatus comprising: one or more processors; and a computer readable storage medium having computer readable program code embodied therewith and executable by the one or more processors, the computer readable program code comprising: computer readable program code configured to accept input of a key word; computer readable program code configured to present a list of possible synonyms of the key word; computer readable program code configured to solicit feedback on whether a possible synonym is a synonym candidate for the key word or not a synonym candidate for the key word, and repeat the soliciting of feedback until a defined endpoint is reached; computer readable program code configured to determine a match score of each of the possible synonyms; computer readable program code configured to retain a number of the possible synonyms up to and including a target number and discarding a number of the possible synonyms in excess of the target number, the discarded synonyms generally having lower match scores than the retained synonyms.

An additional aspect of the invention provides a computer program product comprising: a computer readable storage medium having computer readable program code embodied therewith, the computer readable program code comprising: computer readable program code configured to accept input of a key word; computer readable program code configured to present a list of possible synonyms of the key word; computer readable program code configured to solicit feedback on whether a possible synonym is a synonym candidate for the key word or not a synonym candidate for the key word, and repeat the soliciting of feedback until a defined endpoint is reached; computer readable program code configured to determine a match score of each of the possible synonyms; computer readable program code configured to retain a number of the possible synonyms up to and including a target number and discarding a number of the possible synonyms in excess of the target number, the discarded synonyms generally having lower match scores than the retained synonyms.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIGS. 3-5 each schematically illustrate a display screen or other user interface of a computer system.

DETAILED DESCRIPTION

Figure 1:
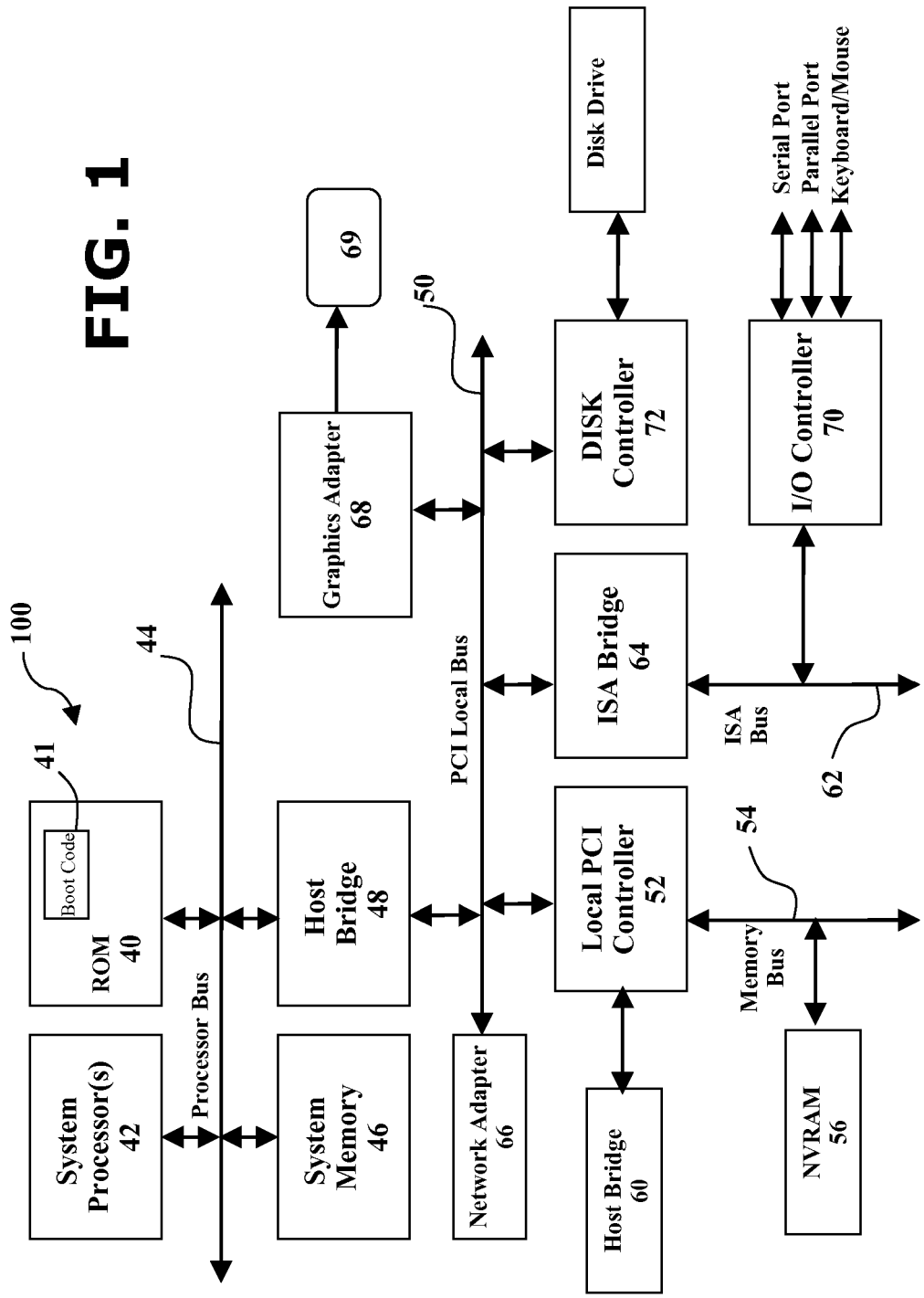
FIG. 1 illustrates a computer system.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring now to FIG. 1, there is depicted a block diagram of an illustrative embodiment of a computer system 100. The illustrative embodiment depicted in FIG. 1 may be an electronic device such as a laptop or desktop personal computer, a mobile/smart phone or the like. As is apparent from the description, however, the embodiments of the invention may be implemented in any appropriately configured device, as described herein.

As shown in FIG. 1, computer system 100 includes at least one system processor 42, which is coupled to a Read-Only Memory (ROM) 40 and a system memory 46 by a processor bus 44. System processor 42, which may comprise one of the AMD line of processors produced by AMD Corporation or a processor produced by INTEL Corporation, is a general-purpose processor that executes boot code 41 stored within ROM 40 at power-on and thereafter processes data under the control of an operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 100 to LAN, and graphics adapter 68, which interfaces computer system 100 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 100 further includes Industry Standard Architecture (ISA) bus 62, which is coupled to PCI local bus 50 by ISA bridge 64. Coupled to ISA bus 62 is an input/output (I/O) controller 70, which controls communication between computer system 100 and attached peripheral devices such as a as a keyboard, mouse, serial and parallel ports, et cetera. A disk controller 72 connects a disk drive with PCI local bus 50. The USB Bus and USB Controller (not shown) are part of the Local PCI controller (52).

The disclosure now turns to some guiding principles or concepts that are relevant to at least one embodiment of the present invention, and their conceptual evolution in support of features of at least one embodiment of the invention.

Generally, in order to find synonyms for a word or phrase, there are two basic guidelines that can be recognized. First, a representation for each word is provided and, secondly, a measure of similarity between words or phrases is determined based on their representation. The similarity measure takes two representations and returns a value such that higher values are returned for pairs of instances that are intuitively more similar.

For representing a word, a vector representation can be used similarly to that normally used for documents. Not only is the target word w considered, but so are all other words w' that appear in the context of all occurrences of word w in the entire collection of documents. Essentially, it is notable that the semantic meaning of a word can usually be captured by other words that appear around it. Thus, in a preferred embodiment, there is considered a context window of length l around each occurrence of word w in a collection of documents, and there is counted a total number of times that another word w' appears in all context windows for w. Treating these counts as term frequencies (TF), there may then be created a table where there is a row for each word w and a column again for each word w'. Each entry for word w thus then shows the term frequencies of all other words in the context of w.

To capture the importance of a context word, IDF (inverse document frequency) can be employed, wherein the number of different rows that the context word appears in is counted, followed by normalization to create a normalized TF-IDF (term frequency-inverse document frequency) vector for each word w.

On the other hand, in order to compare two words represented as above, a cosine similarity measure can be employed by way of comparing two vectors. This measure computes the dot product of two vectors by multiplying the corresponding weights (TF-IDF score) in two word vectors for the same context word and then summing over all of the context words. Essentially, this measure counts the number of shared context words between two words, also taking into account the importance of the context word (as captured by its IDF) and the number of times the word appears in the two contexts (as captured by their TF's).

Thus, an algorithm for finding synonyms of a single word may be laid out as follows:

Algorithm 1—FindSynomymsNaive(word w, threshold t, num k):
  1. Construct TF-IDF vectors for each word in the collection of text documents.
  2. Initialize Candidate Set CS to "empty".
  3. For each word w' in the collection vocabulary,
  4. add w' to CS if similarity of w' with input word w is greater than threshold t.
  5. Sort all words in CS according to their similarity with w and return the top k words.

It should be appreciated, however, that Algorithm 1 on its own can be highly inefficient and not scalable for large document collections, since it needs to consider every word in the vocabulary for each input word.

A more efficient solution makes use of an inverted index on the context words. Thus, for each context word cw, the inverted index lists all vocabulary words w that have high weight for this context word in their context vectors. Using this inverted index, it is possible to identify the synonyms for an input word more efficiently, in accordance with the algorithm below:

Algorithm 2—FindSynonyms(word w, threshold t, num k):
  1. Construct TF-IDF vector for each vocabulary word and Inverted Index for each context word.
  2. Initialize Candidate Set CS to empty.
  3. For each context word, cw, for the input word,
  4. if cw has a high weight for w, add all words in the inverted index of cw to CS 5. For each word w' in the CS,
6. discard w' from CS if similarity of w' with input word w is less than threshold t
7. Sort all words in CS according to their similarity with w and return the top k words.

By way of deriving or determining threshold t mentioned above, this can be specified in a config file or otherwise set externally to a predetermined value. If value of t is very high then very few synonyms will be output but accuracy of the synonyms will be high. On the other hand, if t is very small then many synonyms will be output but their accuracy will be low as many of them will be spurious. Thus, in a preferred embodiment, t should be set externally. Also there is an efficiency issue. Particularly, a small candidate set tends to be more efficient since explicit similarity comparison has to be accomplished with all members of candidate set; this should be kept in mind in setting a threshold value in that a low such value leads to a large candidate set, and vice-versa.

Algorithms 1 and 2, as discussed above, merely consider one input word at a time. Accordingly, it can be appreciated that this would be cumbersome for building a "concept annotator" (or "annotator") from scratch. Generally, an annotator may be thought of as a set of words or phrases that captures different ways of expressing a single, coherent concept. For instance, an automobile dealer annotator, which is configured to capture different ways in which customers express or convey dealer-related issues (e.g. through surveys or related documents), may appear as follows:

[dealer, dealers, dealership, dlr, dlrship, dlrshp, service manager, sales manager, manager]

If a "dealer annotator" is to be built on a dataset, then one can conceivably start off with the words "dealer", "dealership" and "dlr" and expand on that set using a synonym finder as contemplated above in accordance with Algorithms 1 and 2. However, in such a scenario, one of course could only ask for synonyms of the three words separately and then manually combine the synonyms from the three outputs. This again becomes manually intensive for the user.

In contrast, a synonym finder in accordance with a preferred embodiment of the invention identifies synonyms for a set of words or phrases (e.g., bigrams or two words occurring next to each other, trigrams or three words occurring next to each other, etc.). together, instead of taking a single word or phrase as an input. Apart from making the task of annotator building easier and less user intensive, it also makes the synonym finding process more robust.

In accordance with example embodiments of the invention, Algorithms 1 and 2 as set forth above are extended to find the synonyms for a set of words in two different ways, Algorithms 3 and 4, as set forth below:

Algorithm 3: Find Synonym after Merge—FindSynonyms (word set S, threshold t, num k)
1. Create an 'aggregated word' by merging the contexts of each word within the input set
2. Find synonyms for the aggregated context vector using Algorithm 2

Algorithm 4: Merge after Finding Synonyms—FindSynonyms(word set S, threshold t, num k)
1. Initialize Candidate Set CS to empty.
2. For each word w in the input set S,
3. for each context word cw for the word w
4. if cw has high weight for w, add all words in inverted index of cw to CS
5. For each word w' in the CS,
6. find the similarity of w' with each input word w, and
7. compute the aggregate similarity of w with input set S, discard if less than threshold t.
8. Sort all candidate words according to their similarity with S and return the top k words.

The disclosure now turns to the topic of defining or determining the semantics of a set of words. Essentially, the semantics of a "seed set", in accordance with a preferred embodiment, is defined unambiguously. For general purpose English words, each word in the seed set may be assumed to correspond to some concept in a semantic sense hierarchy. Ideally, if all of the words refer to the same concept, then that is the concept desired by the user.

However, multiple possibilities arise when the nodes are not all identical. The user may be interested in all of these concepts, their intersection or some other subset. Similar ambiguities arise even in the absence of a concept structure. The user, conceivably, could be interested in words similar to all of the words in the seed set, or to some subset of them.

To disambiguate, in a preferred embodiment of the invention, there are two logical operators provided for combining words in a seed set. Using the OR operator, the user indicates that the dictionary should contain words that are similar to at least one word in the seed set. Alternatively, using the AND operator, the user can indicate that words in the dictionary need to be similar to all words in the seed set. In general, it is possible to accommodate all combinations of logical operations between seed words.

Finally, in addition to providing examples of words that the user wants in the dictionary, the user can also provide examples of what he/she does not wish to be included. This can significantly enhance the expressibility of the user's language when providing supervision. For example, the user can provide "agent, rep, representative" as a positive seed set for constructing a "Contact Center Agent" dictionary, and can additionally include "manager, mgr, supervisor"' in the negative seed set to indicate that he/she does not want words referring to supervisors to be included in the dictionary. Eliminating these words and their close synonyms can significantly increase the recall of the top k ranking.

Specifically, in this model in accordance with an example embodiment of the invention, the user provides two word sets, $S^p$ and $S^n$. As before, logical operators are used to define the semantics combining the two word sets. In the case of negative examples, typically the user wants to leave out words that are similar to any of the negative seed words. Accordingly, the combination of a positive and a negative seed set is interpreted as $+\{w^p$ in $S^p\}$ AND NOT $\{w^n$ in $S^n\}$, where the operator + may be AND or OR. It is also possible to provide the flexibility of arbitrary combinations of operators.

To handle positive and negative seed sets, in a preferred embodiment the Algorithms 3 and 4 (see above) are employed to create Algorithms 3a and 4a, as follows:

Algorithm 3a: Find Synonym after Merge—FindSynonyms(positive word set $S^p$, negative word set $S^n$, threshold t, num k)
1. Create an "aggregated word" by merging the contexts of each word w in sets $S^p$ and $S^n$
2. Find synonyms for the aggregated context vector using Algorithm 2

Algorithm 4a: Merge after Finding Synonyms—FindSynonyms(positive word set $S^p$, negative word set $S^n$, threshold t, num k)
1. Initialize Candidate Set CS to empty.
2. For each word w in the positive set $S^p$,
3. for each context word cw for the word w, and
4. if cw has high weight for w, add all words in inverted index of cw to CS.
5. For each word w' in the CS, 6. find the similarity of w' with each input word w from $S^p$ and $S^n$, and
7. compute the aggregate similarity of w with sets $S^p$ and $S^n$, discard if less than threshold t
8. Sort all candidate words according to their similarity with S and return the top k words.

The only difference appears in Step 1 of Algorithm 3a and Step 7 of Algorithm 4a, where the aggregate similarity is computed by taking into account the negative words as well. Recall that for any candidate word w, its similarity is aggregated over the positive seed words using maximum or minimum depending on the operator +. The natural way to accommodate the negative seed words is to subtract from this aggregate score the maximum similarity $sim^n$ (exponential decay model $e^{-(1-simn)}$) over all negative seed words. Since this often leads to sharp decrease in overall similarity scores, an exponential decay model is employed in accordance with embodiments of the invention using $sim^n$, so that only words with very high similarity with any negative seed words are affected.

Turning now to interactive synonym finding, when exploring a new dataset, it is often difficult to provide in advance the entire set of positive and/or negative seed words needed by the dictionary building algorithm. Typically, the user may not know the right positive and negative seed words in advance. For example, the user may become aware that the word "rep" is used to refer to contact center agents only after observing it in the initial ranked list, and then he/she can include it in the positive seed set. Similarly, only on observing that "manager" and other related words are appearing in the ranked list for "agent" as the seed word, can he/she realize that he/she needs to include them in the negative seed set.

Such an "online" interactive framework is more natural, where the user starts off with a small set of words, inspects the results, selects and rejects words from the returned ranking, and iterates until he/she is satisfied. His/her interactive supervision then provides the algorithm with the positive and negative seed words at each stage of the iteration, and the seed sets gradually become refined and the ranking comes closer to the user's preference as the iterations continue. Thus, in accordance with an example embodiment of the invention, such an algorithm is as follows:

Algorithm 5: Interactive Synonym Finding—FindSynonymsInteractive( ):
1. Initialize $S^p$ to initial positive words and $S^n$ to empty set
2. Initialize length k, threshold t, operator +
3. Find initial synonyms using Algorithm 3a or 4a—FindSynonyms($S^p$,$S^n$,t,k)
4. If user is not satisfied with synonyms,
5. refine $S^p$ and $S^n$ from user's feedback,
6. get optional feedback on k, t, +, and
7. recompute synonyms using Algorithm 3a or 4a—FindSynonyms($S^p$,$S^n$,t,k)

It can now be appreciated that, in accordance with embodiments of the present invention, an overall interaction framework is shown at a high level in Algorithm 5. It can be seen that the user is able to modify the minimum similarity threshold, the desired number of synonyms and the combination operation interactively and in a manner that he/she deems fit.

Figure 2:
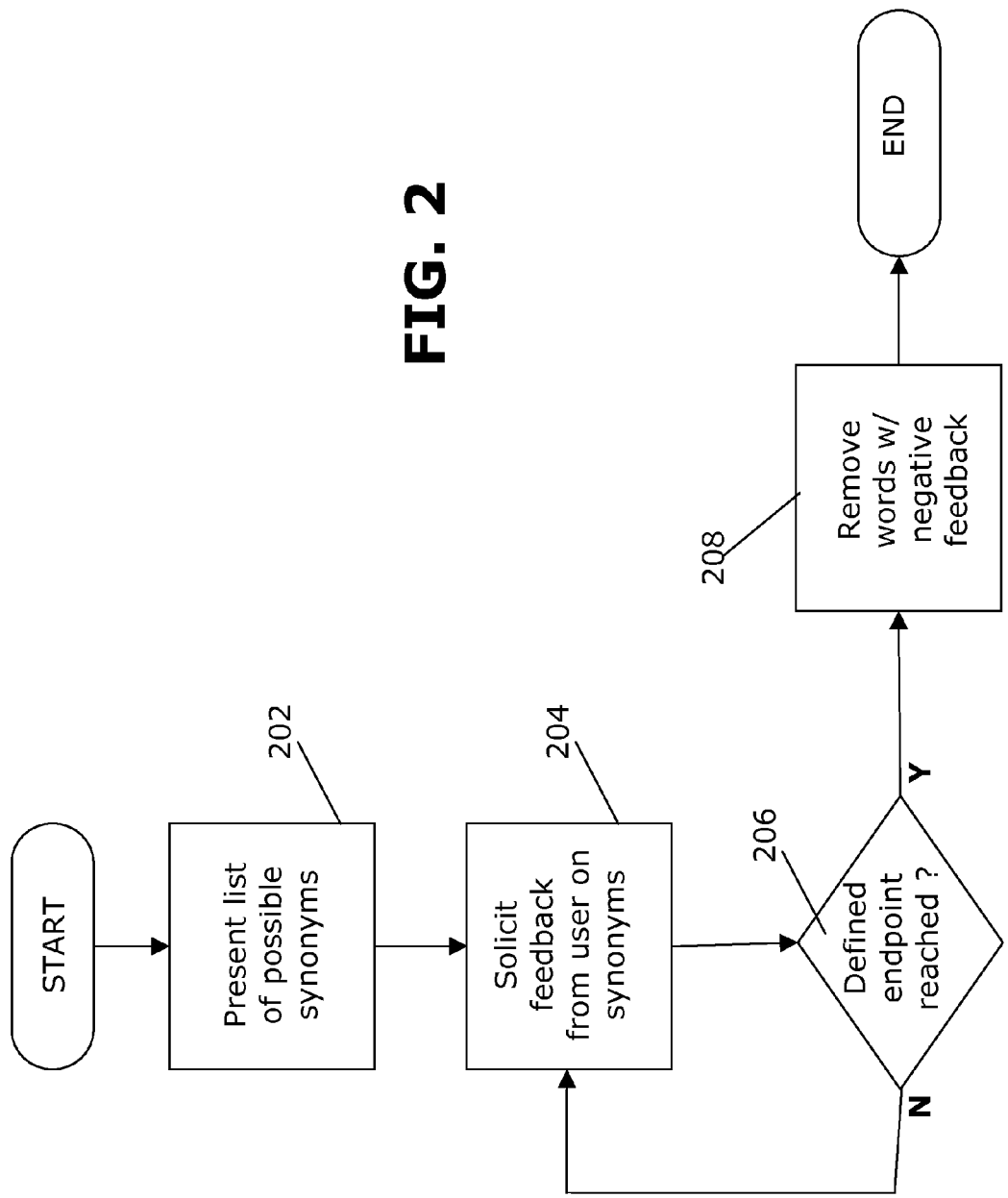
FIG. 2 schematically illustrates a general interactive synonym finding process.

In view of the foregoing, a general interactive process in accordance with an embodiment of the invention is set forth schematically in FIG. 2. As shown, the system (which may be essentially any suitable computer system, such as that indicated at 100 in FIG. 1) first presents a list of all possible synonyms for user feedback (202). User feedback is then solicited, where a user has the opportunity to, e.g., click "YES" or "NO" to give positive or negative feedback, respectively, regarding a given synonym (204). Thence (206), as long as a defined endpoint is not yet reached, the process reverts to soliciting more user feedback (204). If the defined endpoint indeed is reached (206), however, then words with negative feedback are removed (208) to yield the top k words as synonyms.

Figure 4:
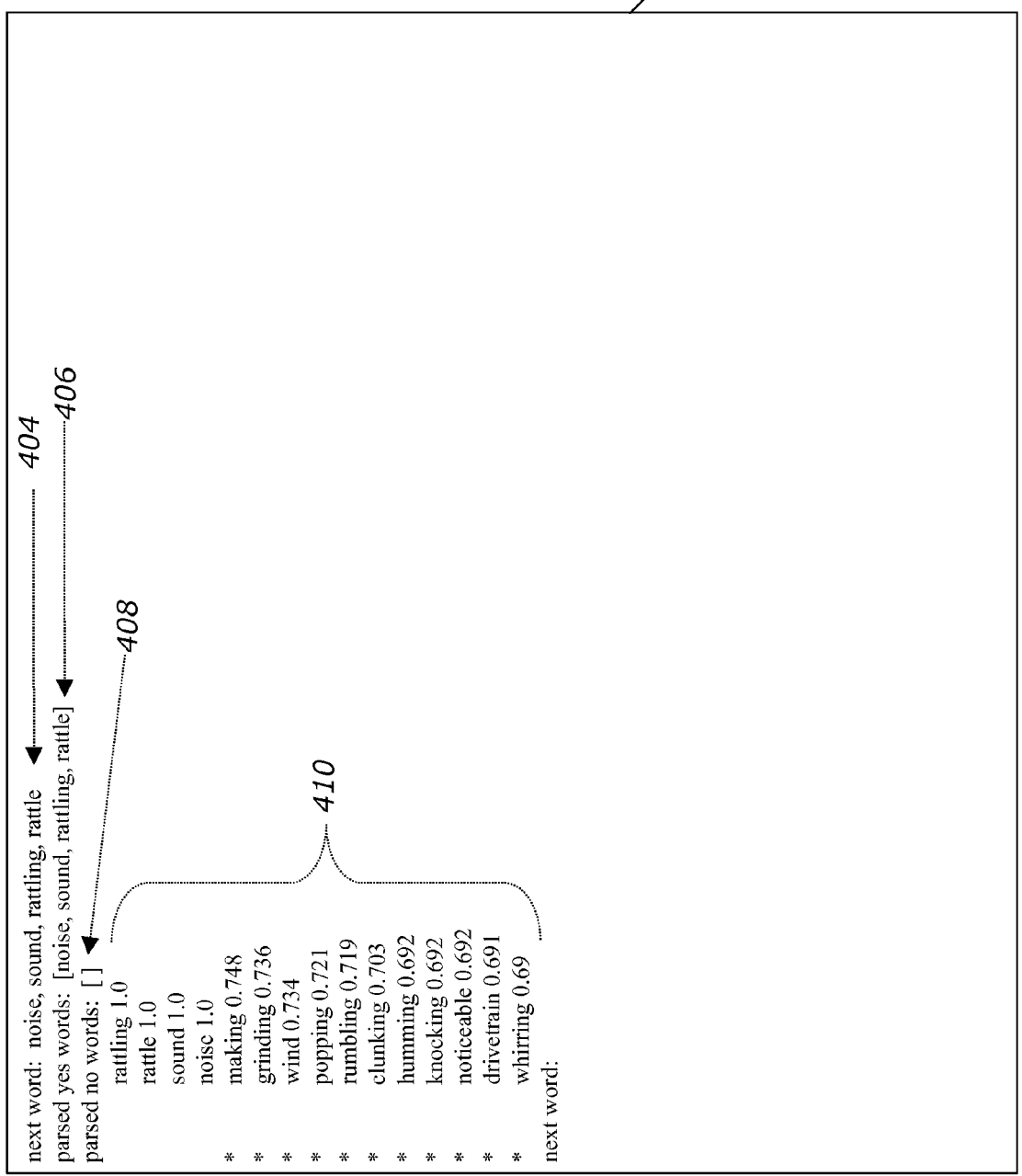
Figure 5:
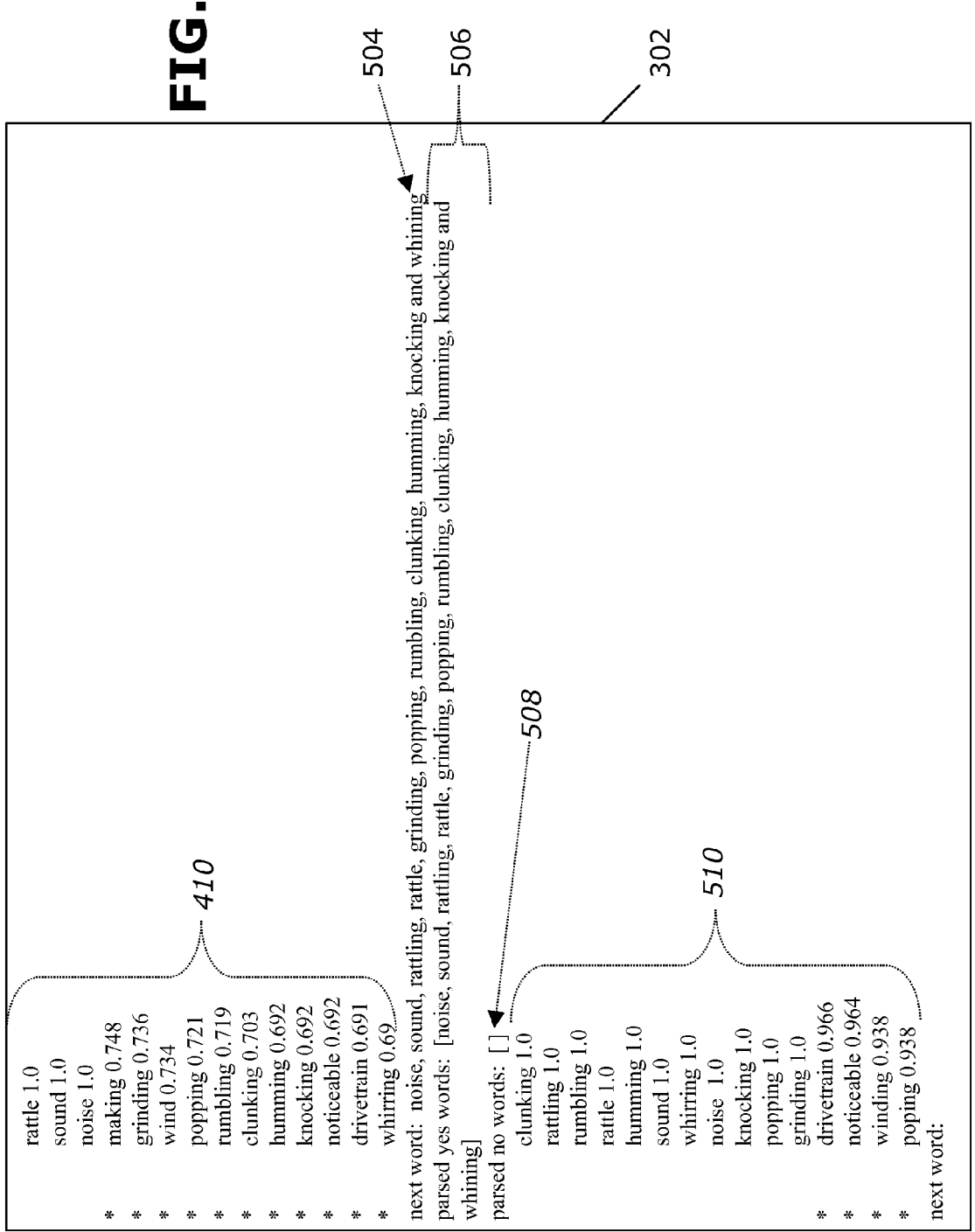

Essentially, in a preferred embodiment, the process is iterated to solicit feedback (204) until a user is satisfied that enough feedback has been solicited. Thus the defined endpoint (206), in an example embodiment, is an endpoint that a user determines intuitively or via another manner of conscious choice while the process is underway (in other words, "ad-hoc"). The user can also be guided by previous experience as to what would constitute an appropriate endpoint. In accordance with a variant embodiment, a process endpoint (206) could alternatively be preset by the user as an automatic bound when a predetermined number of iterations has taken place; in other words, once the preset number of iterations has been traversed, the endpoint is reached and the process proceeds to step 208. By way of an even more precise illustrative and non-restrictive example of interactive synonym finding, suppose that one is interested in creating a noise annotator in the context of automobile repair. FIGS. 3-5 each illustrate a display screen or other user interface 302 of a computer system; screen/interface 302 could be configured in essentially any suitable manner, e.g., similarly to the display screen indicated at 69 in FIG. 1. Successively, FIGS. 3-5 depict steps that could be covered starting from the single word "noise". (In FIGS. 3-5, reference numerals that fall within the bounds of screen/interface 302 are shown in italics, while indicative arrows and brackets are shown in dotted line.)

In FIG. 3, while "noise" is first entered manually (304), automatically it is parsed by default as a "yes" word (306) while, by the same token, it is automatically determined that there are no "no" words (308). An output list 310 is then yielded showing context words and their scores determined, in accordance with a preferred embodiment, in a manner as described heretofore.

As shown in FIG. 4, the user may then manually select (e.g., type in) the words "sound", "rattling" and "rattle" (404) from the output list 310, thereby adding them to the annotator. "Yes" and "no" words are then automatically parsed (406/408, respectively), based on previous users' input.

As another output list is generated (410), in this example some new relevant words have been found, including "grinding", "popping", "rumbling", "clunking", "humming", "knocking" and "whining". As shown in FIG. 5, in the present example, the user selects these words and adds them to the annotator (504) and, as before, "yes" and "no" sets are parsed (506/508, respectively). After the next iteration, in the present example, another word appears in the output list (510), "poping", which can be misspelling of "popping". This is added to the annotator. At this point, the sound annotator includes the following set of words: [noise, sound, rattling, rattle, grinding, popping, rumbling, clunking, humming, knocking, whining, poping]. Here, a decision can be made to finish or alternatively to increase the number of returned synonyms and continue further.

While hereinabove it is noted that a user, in accordance with embodiments of the invention, adds words to the annotator by typing them at the identifier "next word" on screen 302 (at 404 in FIG. 4 and 504 in FIG. 5), it should be appreciated that these words, in a variant embodiment, could be automatically entered by the computer as another iteration starts. Put another way, in accordance with a variant embodiment, the software system can remember previous positive feedbacks and keep them pre-selected and pre-entered when shown in next iteration and only seek new positive and negative feedbacks. A possible disadvantage of this would be the nominal unchangeability of the previous positive feedbacks; however, in an embodiment this can be attended to by providing the user with a mechanism to manually override (e.g., delete) any of the words that the computer automatically so generates.

It should be noted that aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer (device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A method comprising:
   inputting a key word;
   presenting a list of possible synonyms of the key word;
   soliciting user feedback on whether a possible synonym is a synonym candidate for the key word or not a synonym candidate for the key word;
   determining a match score of each of the possible synonyms, the match score incorporating the user feedback as input;
   retaining a number of the possible synonyms up to and including a target number and discarding a number of the possible synonyms in excess of the target number, the discarded synonyms generally having lower match scores than the retained synonyms;

said soliciting of feedback comprising inputting one or more additional key words;

said method further comprising generating an output synonym list subsequent to said inputting of one or more additional key words, the output synonym list including possible synonyms of one or more additional key words;

the output synonym list being derived from comparing, between pairs of words, a context of each instance of each one of the one or more key words among a set of documents.

2. The method according to claim 1, wherein said inputting comprises inputting two or more key words.

3. The method according to claim 1, wherein said comparing comprises applying a cosine similarity measure to vectors representing a context of each word in a pair of words being compared.

4. The method according to claim 1, wherein said presenting comprises presenting a list which is derived from comparing, between pairs of words, a predetermined context of each instance of the key word in a set of documents.

5. The method according to claim 4, wherein said comparing comprises applying a cosine similarity measure to vectors representing a context of each word in a pair of words being compared.

6. The method according to claim 1, wherein said soliciting comprises soliciting manually input user feedback.

7. The method according to claim 1, wherein the defined endpoint is established manually.

8. The method according to claim 7, wherein the defined endpoint is established ad-hoc.

9. The method according to claim 1, wherein said comparing comprises comparing vectors representing a context of each word in a pair of words being compared.

10. An apparatus comprising:
one or more processors; and
a computer readable storage medium having computer readable program code embodied therewith and executable by the one or more processors, the computer readable program code comprising:
computer readable program code configured to accept input of a key word;
computer readable program code configured to present a list of possible synonyms of the key word;
computer readable program code configured to solicit user feedback on whether a possible synonym is a synonym candidate for the key word or not a synonym candidate for the key word, and repeat the soliciting of feedback until a defined endpoint is reached;
computer readable program code configured to determine a match score of each of the possible synonyms, the match score incorporating the user feedback as input;
computer readable program code configured to retain a number of the possible synonyms up to and including a target number and discarding a number of the possible synonyms in excess of the target number, the discarded synonyms generally having lower match scores than the retained synonyms;
wherein said computer readable program code is further configured to:
solicit feedback via accepting input of one or more additional key words; and
generate an output synonym list subsequent to the inputting of one or more additional key words, the output synonym list including possible synonyms of one or more additional key words;
wherein the output synonym list is derived from comparing, between pairs of words, a context of each instance of each one of the one or more key words among a set of documents.

11. The apparatus according to claim 10, wherein said computer readable program code is configured to accept input of two or more key words.

12. The apparatus according to claim 10, wherein said computer readable program code is configured to undertake the comparing via applying a cosine similarity measure to vectors representing a context of each word in a pair of words being compared.

13. The apparatus according to claim 10, wherein said computer readable program code is configured to present a list which is derived from comparing, between pairs of words, a predetermined context of each instance of the key word in a set of documents.

14. The apparatus according to claim 13, wherein said computer readable program code is configured to undertake the comparing via applying a cosine similarity measure to vectors representing a context of each word in a pair of words being compared.

15. The apparatus according to claim 10, wherein said computer readable program code is configured to solicit manually input user feedback.

16. The apparatus according to claim 10, wherein the defined endpoint is established manually.

17. The apparatus according to claim 16, wherein the defined endpoint is established ad-hoc.

18. The method according to claim 10, wherein said computer readable program code is configured to undertake the comparing via comparing vectors representing a context of each word in a pair of words being compared.

19. A computer program product comprising:
a non-transitory computer readable storage medium having computer readable program code embodied therewith, the computer readable program code comprising:
computer readable program code configured to accept input of a key word;
computer readable program code configured to present a list of possible synonyms of the key word;
computer readable program code configured to solicit user feedback on whether a possible synonym is a synonym candidate for the key word or not a synonym candidate for the key word, and repeat the soliciting of feedback until a defined endpoint is reached;
computer readable program code configured to determine a match score of each of the possible synonyms, the match score incorporating the user feedback as input;
computer readable program code configured to retain a number of the possible synonyms up to and including a target number and discarding a number of the possible synonyms in excess of the target number, the discarded synonyms generally having lower match scores than the retained synonyms;
wherein said computer readable program code is further configured to:
solicit feedback via accepting input of one or more additional key words; and
generate an output synonym list subsequent to the inputting of one or more additional key words, the output synonym list including possible synonyms of one or more additional key words;
wherein the output synonym list is derived from comparing, between pairs of words, a context of each instance of each one of the one or more key words among a set of documents.

* * * * *